United States Patent
Wilkinson et al.

(10) Patent No.: US 6,475,651 B1
(45) Date of Patent: Nov. 5, 2002

(54) METHOD AND APPARATUS FOR DETECTING TRANSFER LEAKS IN FUEL CELLS

(75) Inventors: David P. Wilkinson, North Vancouver; Stephen A. Campbell, Maple Ridge, both of (CA)

(73) Assignee: Ballard Power Systems Inc., Burnaby (CA)

(*) Notice: Subject to any disclaimer, the term of this patent is extended or adjusted under 35 U.S.C. 154(b) by 64 days.

(21) Appl. No.: 09/628,626

(22) Filed: Jul. 31, 2000

(51) Int. Cl.$^7$ .............................. H01M 8/04; H01M 8/10
(52) U.S. Cl. ............................... 429/13; 429/12; 429/30
(58) Field of Search .............................. 429/12, 13, 22, 429/23, 25, 30

(56) References Cited

U.S. PATENT DOCUMENTS

| | | | |
|---|---|---|---|
| 5,170,124 A | 12/1992 | Blair et al. | 324/434 |
| 5,230,966 A | 7/1993 | Vosso et al. | 429/26 |
| 5,235,846 A | 8/1993 | Fanciullo | 73/40.7 |
| 5,284,718 A | 2/1994 | Chow et al. | 429/26 |
| 5,763,113 A | 6/1998 | Meltser et al. | 429/13 |
| 6,156,447 A * | 12/2000 | Bette et al. | 429/13 |

FOREIGN PATENT DOCUMENTS

| | | |
|---|---|---|
| DE | 196 45 989 | 12/1997 |
| DE | 196 45 990 | 12/1997 |
| DE | 196 49 434 | 1/1998 |
| DE | 196 49 436 | 1/1998 |
| JP | 59-149660 | 8/1984 |
| JP | 60-100374 * | 6/1985 |
| JP | 61-88463 | 5/1986 |
| JP | 61-279071 | 12/1986 |
| JP | 63-32866 | 2/1988 |
| JP | 63-51061 | 3/1988 |
| JP | 63-110556 | 5/1988 |
| JP | 63-117277 | 5/1988 |
| JP | 1-276566 | 11/1989 |
| JP | 3-40378 | 2/1991 |
| JP | 3-250564 | 11/1991 |
| JP | 3-254070 | 11/1991 |
| JP | 3-263763 | 11/1991 |
| JP | 6-223850 | 8/1994 |
| JP | 8-167423 | 6/1996 |
| JP | 8-185878 | 7/1996 |
| JP | 8-185879 | 7/1996 |
| JP | 8-329965 | 12/1996 |
| JP | 9-27336 | 1/1997 |
| JP | 9-283168 | 10/1997 |
| JP | 10-92460 | 4/1998 |
| JP | 11-67255 | 3/1999 |

* cited by examiner

*Primary Examiner*—Patrick Ryan
*Assistant Examiner*—Jonathan Crepeau
(74) *Attorney, Agent, or Firm*—McAndrews, Held & Malloy, Ltd.

(57) ABSTRACT

A method of detecting transfer leaks within a solid polymer electrolyte fuel cell stack comprises: supplying fuel or inert gas to the oxidant manifold(s) of the stack at a first pressure; supplying the other of fuel or inert gas to the fuel manifold(s) at a second pressure greater than or equal to the first pressure; optionally supplying fuel to the coolant manifold(s) at a third pressure; applying a potential difference across at least one of the fuel cell assemblies; and measuring the transfer current across the fuel cell assembly or assemblies. A corresponding apparatus detects transfer leaks within solid polymer electrolyte fuel cells stacks.

18 Claims, 2 Drawing Sheets

METHOD AND APPARATUS FOR DETECTING TRANSFER LEAKS IN FUEL CELLS

FIELD OF THE INVENTION

The present invention relates to methods and apparatus for detecting transfer leaks in solid polymer electrolyte fuel cells and locating such cells in fuel cell stacks.

BACKGROUND OF THE INVENTION

Electrochemical fuel cells convert reactants, namely fuel and oxidant, to generate electric power and reaction products. Electrochemical fuel cells generally employ an electrolyte disposed between two electrodes, namely a cathode and an anode. The electrodes each comprise an electrocatalyst disposed at the interface between the electrolyte and the electrodes to induce the desired electrochemical reactions.

Solid polymer fuel cells employ a solid polymer electrolyte, or ion exchange membrane. The membrane is typically interposed between two electrode layers, forming a membrane electrode assembly ("MEA"). The membrane is typically proton conductive and acts as a barrier, isolating the fuel and oxidant streams from each other on opposite sides of the MEA. The MEA is typically interposed between two plates to form a fuel cell assembly. The plates act as current collectors, provide support for the adjacent electrodes, and typically contain flow field channels for supplying reactants to the MEA or circulating coolant. The fuel cell assembly is typically compressed to ensure good electrical contact between the plates and the electrodes, as well as good sealing between fuel cell components. A plurality of fuel cell assemblies may be combined electrically, in series or in parallel, to form a fuel cell stack. In a fuel cell stack, a plate may be shared between two adjacent fuel cell assemblies, in which case the plate also separates the fluid streams of the two adjacent fuel cell assemblies. Such plates are commonly referred to as bipolar plates and may have flow channels for directing fuel and oxidant, or a reactant and coolant, on each major surface, respectively.

The fuel fluid stream which is supplied to the anode may be a gas such as, for example, substantially pure gaseous hydrogen or a reformate stream comprising hydrogen, or a liquid such as, for example, aqueous methanol. The fuel fluid stream may also contain other fluid components such as, for example, nitrogen, carbon dioxide, carbon monoxide, methane, and water. The oxidant fluid stream, which is supplied to the cathode, typically comprises oxygen supplied as, for example, substantially pure gaseous oxygen or a dilute oxygen stream, such as, for example, air, which may also contain other components such as nitrogen, argon, water vapor, carbon monoxide, and carbon dioxide. Various sealing mechanisms are used to fluidly isolate the fuel and oxidant streams from one another in the fuel cell.

The electrochemical reactions in a solid polymer fuel cell are generally exothermic. Accordingly, a coolant is typically also needed to control the temperature within a fuel cell assembly to prevent overheating. Conventional fuels cells employ a liquid, such as, for example, water to act as a coolant. In conventional fuel cells, the coolant stream is fluidly isolated from the reactant streams.

Thus, conventional fuel cells typically employ three fluid streams, namely fuel, oxidant, and coolant streams, which are fluidly isolated from one another. See, for example, U.S. Pat. No. 5,284,718 and FIGS. 1, 2A and 2B of U.S. Pat. No. 5,230,966, which are incorporated herein by reference in their entirety, for examples of typical fuel cell assemblies configured to fluidly isolate the aforementioned three fluid streams. Fluid isolation is important for several reasons. For example, one reason for fluidly isolating the fuel and oxidant streams in a hydrogen-oxygen fuel cell is that hydrogen and oxygen are particularly reactive with each other. Accordingly, the membrane and plates are, therefore, substantially impermeable to hydrogen and oxygen. However, since the membrane also functions as an electrolyte, the membrane is generally permeable to protons and water. (Water is generally required for proton transport in membrane electrolytes.)

The coolant fluid is preferably isolated from the reactant fluids to prevent dilution and contamination of the reactant streams. Furthermore, water may cause flooding in the reactant fluid passages which prevents the reactants from reaching the electrochemically active membrane-electrode interface. It is also undesirable for the reactant streams to leak into the coolant stream because this reduces operating efficiency as the leaked reactants are not used to generate electrical power. Likewise, leakage of any of the fluids to the surrounding atmosphere is generally undesirable.

There are several conventional methods of detecting leaks. For example, in a hydrogen-oxygen fuel cell, the oxidant exhaust stream can be monitored to detect the presence of hydrogen. When hydrogen is detected in the oxidant exhaust stream, this may indicate a leak. A problem with this method is that hydrogen may be present in the oxidant exhaust stream for reasons other than a leak. For example, if there is a shortage of oxygen at the cathode, protons arriving at the cathode from the anode may recombine with electrons to form hydrogen. There are many possible causes for such an oxygen shortage. For example, an oxygen shortage may result from a sudden increase in power output demand, a malfunctioning compressor, a blockage in fluid flow field channels caused by an accumulation of product water, or a clogged air filter.

An additional problem with using a constituent such as hydrogen, other reactants, or reaction products, as an indicator of a leak is that these constituents may be reactive within the fuel cell. These constituents may be particularly reactive in the presence of the electrocatalyst at the interfaces between the electrolyte and the anode and cathode. Consequently, these substances may react partially or completely prior to being exposed to a detector located in the fluid exhaust manifold. Thus, the concentration of any detected substances may not accurately reflect to the amount of the constituent substance that is leaking and may prevent or delay the detection of a leak.

When the fuel stream comprises carbon dioxide, a method of detecting leaks between the fuel and oxidant fluid streams involves detecting greater than a threshold level of carbon dioxide in the oxidant exhaust stream. A disadvantage of this method is that an oxidant supply stream, such as air, may already comprise carbon dioxide in varying concentrations. This may be especially true in vehicular applications where the oxidant intake may receive air comprising the exhaust streams of other vehicles. Therefore, a disadvantage of this method is that for reliable operation, it is necessary to measure the carbon dioxide concentration in the oxidant intake stream, as a reference, in addition to measuring the carbon dioxide concentration in the oxidant exhaust stream.

Another method of detecting leaks between the fuel and oxidant fluid streams is to measure the oxygen concentration in the fuel exhaust stream. Like the aforementioned methods, a problem with this method is that there are other potential sources of oxygen at the anode. For example, sometimes oxygen is introduced into fuel reformate supply streams to counter the effects of catalyst poisoning. Another source of oxygen at the anode is water that may be converted to oxygen, electrons, and protons at the anode when there is a shortage of fuel (that is, fuel starvation). Therefore, a disadvantage of these oxygen detection methods is that other parameters must be analyzed to determine when the oxygen measured within the fuel exhaust stream is the result of fuel starvation, a leak, or residual oxygen that was added to the fuel supply stream.

Fuel cells are also typically checked for leaks prior to operating the fuel cell to produce power, for example, after assembly or during routine maintenance. Another method of checking for leaks is to introduce a gas into the inlet of one of the fluid passages while the outlet is sealed. The other fuel cell fluid passage inlets are sealed and the outlets are typically fluidly connected to a bubble tube. The volume of any gas that bubbles through the bubble tube is measured to determine if there is any leakage. A problem with this test is that it is difficult to administer with consistent results and the test is a time consuming one. Also, particularly with respect to the reactant fluid passages, the pressurization of only one reactant fluid passage may result in damage to the thin membrane electrolyte layer and/or other fuel cell components.

Further, in the foregoing methods it may not be possible to easily and reliably determine which fuel cell(s) in the stack are leaking, if a leak is detected. Thus, it is often necessary to disassemble the stack and re-test it in sections until each leaking cell is found. Such a time-intensive, iterative process is less than desirable.

Accordingly, there is a need for a simple and reliable method of detecting a leak in a fuel cell stack. That is, a method that provides a rapid indication of a leak and that can identify the fuel cell or cells that are leaking.

SUMMARY OF THE INVENTION

A method of detecting transfer leaks within a fuel cell stack is provided. In one embodiment of the present method, the stack comprises: a plurality of fuel cell assemblies each comprising a membrane electrode assembly comprising an anode, a cathode, and an ion exchange membrane interposed therebetween; at least one fuel manifold fluidly connected to the fuel stream passages of the fuel cell assemblies; and, at least one oxidant manifold fluidly connected to the oxidant stream passages of the fuel cell assemblies. The embodiment of the present method comprises:

(a) supplying inert gas to the oxidant manifold(s) at a first pressure;

(b) supplying fuel to the fuel manifold(s) at a second pressure greater than or equal to the first pressure;

(c) applying a potential difference across at least one of the fuel cell assemblies such that the cathode(s) thereof is/are more positive than the anode(s) thereof; and (d) measuring the transfer current across the fuel cell assembly or assemblies.

In another embodiment of the present method, the fuel cell stack further comprises coolant stream passages in thermal communication with at least a portion of the fuel cell assemblies, and at least one coolant manifold fluidly connected to the coolant stream passages. This embodiment of the present method comprises:

(a) supplying fuel to the fuel manifold(s) at a first pressure;

(b) supplying inert gas to the oxidant manifold(s) at a second pressure;

(c) supplying fuel to the coolant manifold(s) at a third pressure;

(d) applying a potential difference across at least one of the fuel cell assemblies such that the cathode(s) thereof is/are more positive than the anode(s) thereof; and (e) measuring the transfer current across the fuel cell assembly or assemblies.

In operation, the third pressure is greater than at least one of the first and second pressures. The first and second pressures may be substantially the same, or the first pressure may be greater than the second pressure.

Yet another embodiment of the present method comprises:

(a) supplying inert gas to the fuel manifold(s) at a first pressure;

(b) supplying fuel to the oxidant manifold(s) at a second pressure;

(c) supplying fuel to the coolant manifold(s) at a third pressure;

(d) applying a potential difference across at least one of the fuel cell assemblies such that the cathode(s) thereof is/are more positive than the anode(s) thereof; and (e) measuring the transfer current across the fuel cell assembly or assemblies.

In operation, the third pressure is greater than at least one of the first and second pressures. The first and second pressures may be substantially the same, or the first pressure may be greater than the second pressure.

In the foregoing embodiments, the pressure differential between the first and second pressures may be between 0 kPa and about 70 kPa, preferably between about 6.5 kPa and about 35 kPa. The inert gas may be selected from the group consisting of nitrogen, argon, helium, and carbon dioxide. The potential difference may have a magnitude of about 0.2 V to about 0.9 V, preferably of about 0.5 V.

The present method may further comprise comparing the measured transfer current with a reference transfer current.

An apparatus for detecting transfer leaks within a fuel cell stack is also provided. In one embodiment, the stack comprises a plurality of fuel cell assemblies, at least one fuel manifold fluidly connected to the fuel cell assemblies, and at least one oxidant manifold fluidly connected to the fuel cell assemblies. The embodiment of the present apparatus comprises:

(a) a fuel source fluidly connectable to the fuel manifold(s) for supplying fuel thereto at a first pressure;

(b) an inert gas source fluidly connectable to the oxidant manifold(s) for supplying inert gas thereto at a second pressure;

(c) a DC power supply connectable to at least one of the fuel cell assemblies; and (d) at least one device for measuring the transfer current across the fuel cell assembly or assemblies.

The apparatus may further comprise a transfer current display for receiving the output signal from the device(s).

In another embodiment of the present apparatus, the fuel cell stack further comprises coolant stream passages in thermal communication with at least a portion of the fuel cell assemblies, and at least one coolant manifold fluidly connected to the coolant stream passages. This embodiment of the present apparatus comprises:

(a) a first fuel source fluidly connectable to one of the fuel and oxidant manifolds for supplying fuel thereto at a first pressure;

(b) an inert gas source fluidly connectable to the other of the fuel and oxidant manifolds for supplying inert gas thereto at a second pressure;

(c) a second fuel source fluidly connectable to the coolant manifold(s) for supplying fuel thereto at a third pressure;

(d) a DC power supply connectable to at least one of the fuel cell assemblies; and (e) at least one device for measuring the transfer current across the fuel cell assembly or assemblies.

The first fuel source and second fuel source may be the same or different. Similarly, the first and second pressures may be substantially the same or different. The apparatus may further comprise a transfer current display for receiving the output signal from the device(s).

In yet another embodiment of the present apparatus, the stack comprises a plurality of fuel cell assemblies, a fuel source fluidly connected to the stack and adapted to supply it with fuel at a first selected pressure, and an oxidant source fluidly connected to the stack and adapted to supply it with oxidant at a second selected pressure. This embodiment of the present apparatus comprises:

(a) a DC power supply connectable to at least one of the fuel cell assemblies;

(b) at least one device for measuring the potential difference across the fuel cell assembly or assemblies, and for generating an output signal representative of the measured potential difference; and (c) a display for receiving the output signal from the device(s).

DETAILED DESCRIPTION OF PREFERRED EMBODIMENT(S)

As used in this description and in the appended claims, "fuel" means a substantially pure hydrogen gas stream or a reformate gas stream comprising hydrogen, and "oxidant" means a substantially pure oxygen gas stream or a gas stream comprising oxygen, such as air, for example. A "transfer leak" refers to a condition where reactants may mix with each other or with coolant within a fuel cell due to a defect in an MEA, flow field plate(s), and/or the seals therebetween. More specifically, a "reactant transfer leak" means a transfer leak where fuel and oxidant may mix. Typical sources of reactant transfer leaks include, for example, a hole in the membrane of the MEA or a cracked fuel-oxidant bipolar flow field plate. A "fuel-to-coolant transfer leak" means a transfer leak where fuel and coolant may mix and an "oxidant-to-coolant transfer leak" means a transfer leak where oxidant and coolant may mix. Typical sources of fuel-to-coolant and oxidant-to-coolant transfer leaks include, for example, cracked fuel-coolant bipolar flow field plates and cracked oxidant-coolant bipolar flow field plates, respectively. "Reactant-to-coolant transfer leak" refers to fuel-to-coolant and oxidant-to-coolant transfer leaks generically. "Inert gas" means a gas stream comprising a gas that is substantially unreactive in the fuel cell stack, such as nitrogen, argon, helium, or carbon dioxide, for example. "Transfer current" refers to the current flowing through a fuel cell due to oxidation of hydrogen at one of the electrodes thereof.

The present method and apparatus allow solid polymer electrolyte fuel cells in a fuel cell stack to be checked for transfer leaks prior to operating the fuel cell to produce power, for example, after assembly or during routine maintenance.

Figure 1:
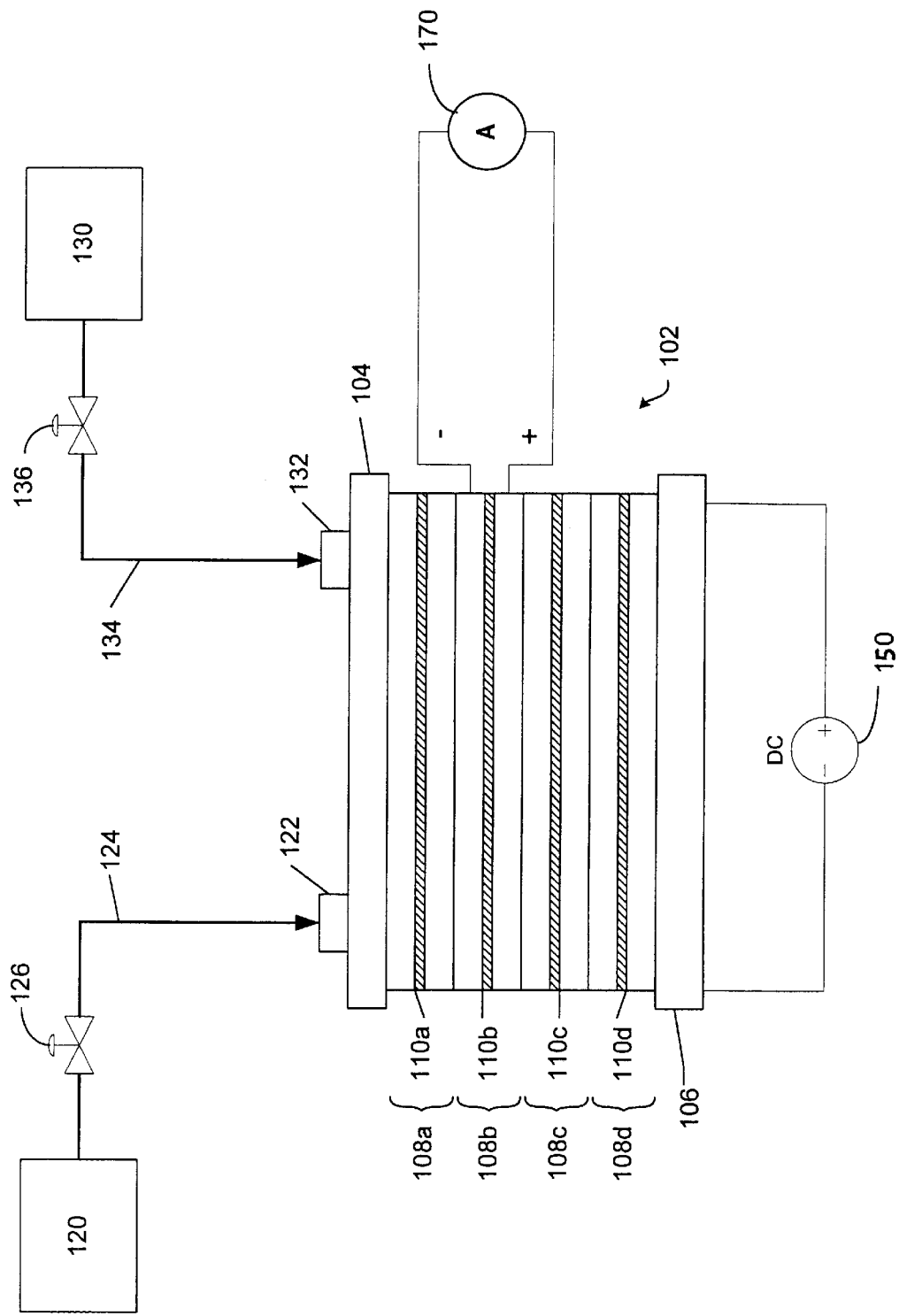
FIG. 1 is a schematic illustration of embodiments of the present apparatus.
Figure 2:
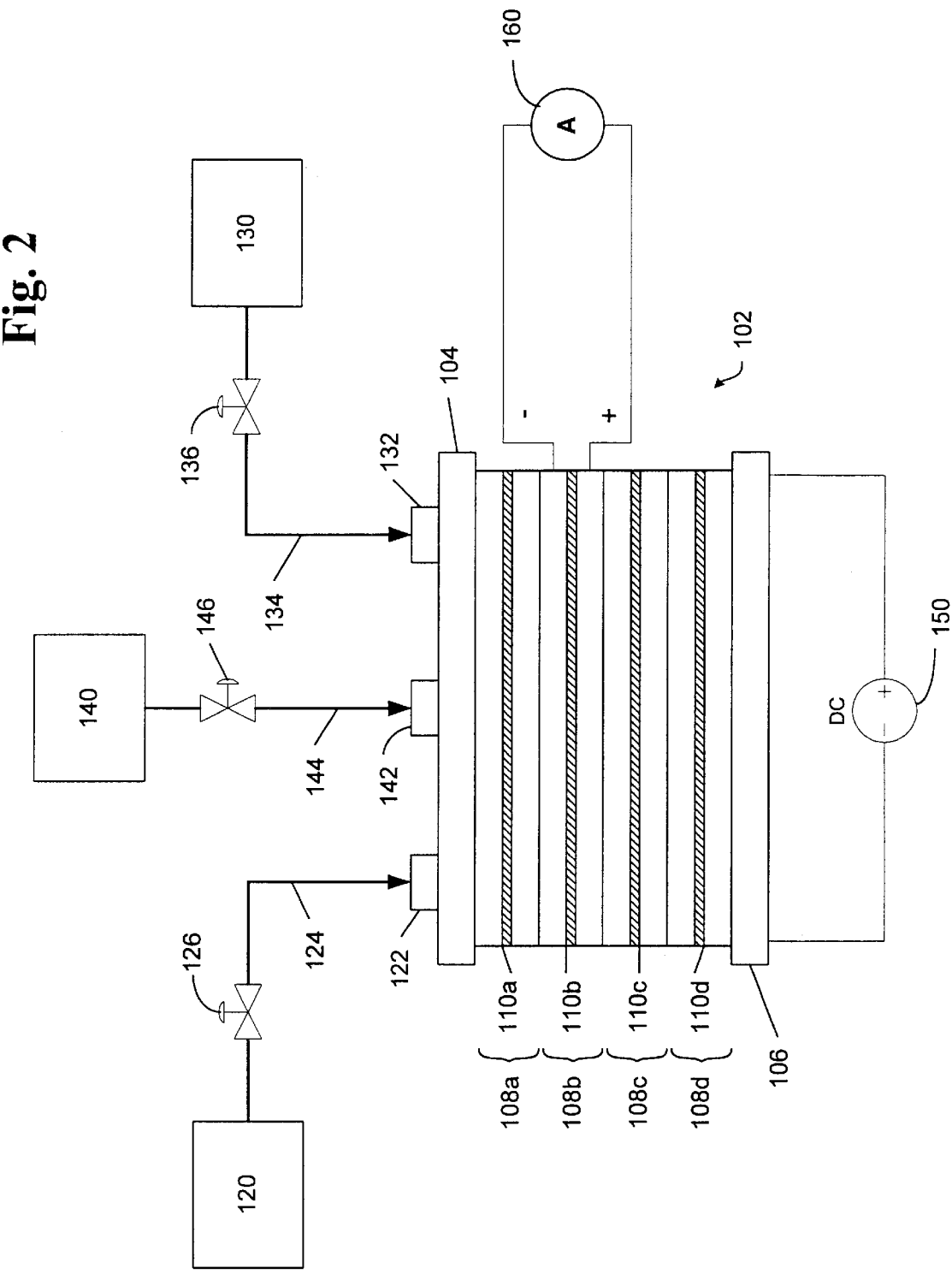
FIG. 2 is a schematic illustration of other embodiments of the present apparatus.

FIGS. 1 and 2 are schematic illustrations of embodiments of the present apparatus. Fuel cell stack 102 comprises top and bottom end plates 104 and 106, respectively, and fuel cells 108$a$–108$d$. Stack 102 is shown with four fuel cells for illustration purposes only; the number of fuel cells in stack 102 will depend upon the application, although a typical fuel cell stack will contain tens to hundreds of fuel cells. Fuel cells 108$a$–108$d$ comprise ion exchange membranes 110$a$–110$d$, respectively. Gas source 120 is removably connected to fuel inlet manifold 122 via line 124 to supply a gas stream to stack 102. Pressure valve 126 regulates the pressure of the gas stream supplied to stack 102. Similarly, gas source 130 is removably connected to oxidant inlet manifold 132 via line 134 to supply a gas stream to stack 102. Pressure valve 136 regulates the pressure of the gas stream supplied to stack 102. The embodiments of the present apparatus illustrated in FIG. 2 further comprise fuel supply 140 removably connected to coolant inlet manifold 142 via line 144 for supplying fuel to stack 102, where pressure valve 146 regulates the pressure of the fuel stream supplied thereto. Gases supplied to stack 102 are exhausted via corresponding exhaust manifolds (not shown). DC power supply 150 is connectable to stack 102 for applying a selected potential difference across at least one of the fuel cells in the stack. Preferably DC power supply 150 applies a selected potential difference across each of a plurality of fuel cells in the stack, and more preferably across each of the fuel cells in the stack. Ammeter 160 is connectable to any of the fuel cells of stack 102 for measuring the transfer current flowing therethrough, and is illustrated connected to fuel cell 108$b$. Further particulars of the embodiments of the present apparatus illustrated in FIGS. 1 and 2 will be discussed below.

In a preferred embodiment of the present method and apparatus for detecting reactant transfer leaks, fuel is supplied to the fuel manifold at a first pressure ($P_1$) and inert gas is supplied to the oxidant manifold at a second pressure ($P_2$), such that a pressure differential in favor of the fuel is maintained (that is, $P_1 > P_2$). The pressure differential may be between 0 kPa and about 70 kPa, and is preferably between about 6.5 kPa and about 35 kPa. A potential difference is then applied across at least one of the fuel cells in the stack such that the cathode of the fuel cell is more positive than the anode (the anode is the reference electrode). Referring to FIGS. 1 and 2, for example, gas supply 120 comprises fuel, gas supply 130 comprises inert gas, and valves 126 and 136 are adjusted to ensure that fuel is supplied to stack 102 at a higher pressure than the inert gas. In addition, in the apparatus of FIG. 2, valve 146 is adjusted to prevent the supply of gas from gas supply 140 to stack 102. DC power supply 150 applies a potential difference across at least one of the fuel cells in stack 102. Then the transfer current of the fuel cell(s) in the stack is measured. Absent a reactant transfer leak, a minimal amount of hydrogen diffuses across the membrane and a small constant transfer current is generated. A reactant transfer leak may result in an increased rate of hydrogen transfer to the cathode side of the fuel cell and a corresponding increase in the rate of cathode oxidation of hydrogen. This in turn will result in an increase in transfer current that may be detected by the ammeter. The transfer current of a given cell is compared to the transfer current of other cells in the stack or a reference transfer current. If the measured cell transfer current is greater than the comparison transfer current then a reactant transfer leak is indicated.

In another embodiment of the present method and apparatus for detecting oxidant-to-coolant transfer leaks, fuel is supplied to the coolant manifold at a first pressure ($P_1$), to a fuel manifold at a second pressure ($P_2$), and inert gas is supplied to the oxidant manifold at a third pressure ($P_3$), such that a pressure differential in favor of the fuel supplied to the coolant manifold is maintained (that is, $P_1 > P_2, P_3$). The pressure differential may be between 0 kPa and about 70 kPa, and is preferably between about 6.5 kPa and about 35 kPa. A potential difference is then applied across at least one of the fuel cells in the stack such that the cathode of the fuel cell is more positive than the anode (the anode is the reference electrode). Referring to FIG. 2, for example, gas supplies 120 and 140 comprise fuel, gas supply 130 comprises inert gas, and valves 126, 136 and 146 are adjusted to ensure that fuel from gas supply 140 is supplied to stack 102 at a higher pressure. DC power supply 150 applies a potential difference across at least one of the fuel cells in the stack 102. Then the transfer current of the fuel cell(s) in the stack is measured. Absent an oxidant-to-coolant transfer leak a minimal amount of hydrogen diffuses across the membrane and a small constant transfer current is generated. An oxidant-to-coolant transfer leak may result in an increase in the rate of cathode oxidation of hydrogen due to transfer of fuel from the coolant pathways to the cathode compartment of the fuel cell. This, in turn, will result in the generation of a transfer current that may be detected by the ammeter. The transfer current of a given cell is compared to the transfer current of other cells in the stack or a reference transfer current. If the measured cell transfer current is greater than the comparison transfer current then an oxidant-to-coolant transfer leak is indicated.

Preferably, the pressures of the fuel and inert gas supplied to the fuel and oxidant manifolds, respectively, are substantially the same. This may minimize any transfer current changes due to concurrent reactant transfer leaks that may otherwise mask the presence of an oxidant-to-coolant transfer leak. Alternatively, a pressure differential in favor of the fuel may be maintained. This may allow the detection of reactant transfer leaks as described, as well as oxidant-to-coolant transfer leaks. In this instance, it may not be possible to determine whether the indicated transfer leak is reactant transfer leak or an oxidant-to-coolant transfer leak, depending on the stack configuration. Nonetheless, the defective fuel cell may still be identified.

Yet another embodiment of the present method and apparatus for detecting fuel-to-coolant transfer leaks is basically the same as described in the preceding embodiment, except that inert gas and fuel are supplied to the fuel and oxidant manifolds, respectively, and the potential difference is applied to the fuel cell(s) such that the anode is more positive than the cathode (in this embodiment, the cathode is the reference electrode). Thus, referring again to FIG. 2, in the embodiment of the corresponding apparatus, gas supply 120 comprises inert gas and gas supply 130 comprises fuel. Absent a fuel-to-coolant transfer leak a minimal amount of hydrogen diffuses across the membrane and a small constant transfer current is generated. A fuel-to-coolant transfer leak may result in an increase in the rate of anode oxidation of hydrogen due to transfer of fuel from the coolant pathways to the anode compartment of the fuel cell, and the generation of a measurable transfer current that can be detected by the ammeter. Thus, if the measured cell transfer current is greater than the comparison transfer current then a fuel-to-coolant transfer leak is indicated.

In another preferred embodiment of the present method and apparatus, fuel and inert gas are supplied to the fuel and oxidant manifolds of the stack, respectively, and reactant transfer leaks are detected as described previously. Then, fuel is also supplied to the coolant manifold, such that a pressure differential in favor of the fuel supplied thereto is maintained. Preferably the pressure of the fuel supplied to the fuel manifold is reduced to substantially the same pressure as inert gas supplied to the oxidant manifold. Oxidant-to-coolant transfer leaks may then be detected as described. Next, the inert gas and fuel are switched (that is, inert gas and fuel are supplied to the fuel and oxidant manifolds, respectively), and the potential difference applied to fuel cell(s) in the stack is reversed such that the anodes are more positive than the cathodes. Then fuel-to-coolant transfer leaks may be detected as described previously. If desired, fuel-to-coolant transfer leaks may be detected before oxidant-to-coolant leaks, although this will necessitate switching fuel and inert gas from the fuel and oxidant manifolds, respectively, and back again. Alternatively, the step of testing for fuel-to-coolant transfer leaks may be omitted or substituted for the oxidant-to-coolant leak detection step.

Where reactant-to-coolant transfer leaks are detected, the location of the leak may affect the ability to locate it. For example, if the leak occurs at or near the inlet ports of the fuel cell, fuel supplied to the coolant manifold may diffuse into the fuel manifold to some extent and enter the reactant compartments of adjacent fuel cells (the size of the transfer leak will also tend to affect the extent of diffusion). As a result, a detectable transfer current may be generated in at least some of these adjacent fuel cells as well, and it may not be possible to pinpoint the transfer leak. Nonetheless, it should be possible to locate the leak within a small group of suspect fuel cells. Alternatively, if the leak occurs at or near the outlet ports of the fuel cell, it may be difficult to detect the leak by the present method.

Although the various gas supplies are described in the foregoing embodiments as separate gas sources having independent pressure regulation, other arrangements are also suitable. For example, a single fuel supply may be used to supply fuel to the coolant manifold of the stack and the fuel or oxidant manifold thereof. Any conventional means for providing two gas streams from a single source may be employed. For example, two lines having independent pressure regulation may be employed. As a further example, a three-way valve could be used. Other suitable means will be apparent to persons skilled in the art.

Preferably, the inert gas is supplied to the stack at a low flow rate. If the inert gas is supplied at a high flow rate, it will tend to flush any fuel present due to a transfer leak from the fuel cell before it has been oxidized to an appreciable extent. This tends to reduce the magnitude of the transfer current produced by the transfer leak and may negatively impact the sensitivity of the present method. The appropriate low flow rate depends on such factors as the number of fuel cells in the stack. For example, a flow rate of about 0.5 to 1.5 standard liters per minute (SLPM) of $N_2$ for a four-cell Ballard Mark 513 stack has been determined to be adequate. The appropriate flow rate tends to increase with the number of fuel cells in the stack, and may be easily determined by those skilled in the art.

Preferably, the same potential difference is applied across each of a plurality of the fuel cells, and more preferably across all of the fuel cells in the stack. That is, where the potential difference is applied across more than one fuel cell in the stack, it is preferably applied across each fuel cell individually rather than across a group of fuel cells. The magnitude of the applied potential difference is preferably between 0.2 and 0.9 volts, and more preferably about 0.5 V, relative to the reference electrode potential. At the same time it is preferable to measure the transfer currents of a plurality of the fuel cells in the stack, and more preferably the transfer current of each of the fuel cells in the stack is measured. It is preferred to measure the transfer current of each of the fuel cells in the stack in order to determine as efficiently as possible which, if any, have transfer leaks.

In addition to detecting transfer leaks, the present method and apparatus may also be used to estimate the size of the transfer leak. The size of the transfer leak may be calculated from the measured transfer current based on the following equations:

$\Delta Q = i \Delta t$, and $m = QMW/(nF)$, where Q is charge (C), i is current (A), t is time (s), m is mass (g), MW is molecular weight (g/mol), n is the number of electrons, and F is Faraday's number (96,485 C/mol). Assuming fuel obeys Avogadro's Law for ideal gases, that is, 22.4 L/mol (at 0° C., 1 atm), the relationship between a transfer leak and its measured transfer current, x, will be (at 25° C., 1 atm):

(x A) (60 s/min) (2.02 g/mol)×(mol/2.02 g) (22.4 L/mol)(1000 ml/L)(14.7 psig/30 psig)(298 K/273 K)2(96,485 C/mol)=y ml/min.

For example, a 2.6 ml/min transfer leak may be expected to generate a 0.7 A transfer current. The ability to quantify the size the of the transfer leak may be useful in determining the likely source of the leak, estimating limit conditions for fuel cell materials, or in quality control analyses, for example.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the scope of the invention.

What is claimed is:

1. A method of detecting transfer leaks within a fuel cell stack, said stack comprising:
  a plurality of fuel cell assemblies each comprising a membrane electrode assembly comprising an anode, a cathode, and an ion exchange membrane interposed therebetween,
  at least one fuel manifold fluidly connected to the fuel stream passages of said plurality of fuel cell assemblies, and
  at least one oxidant manifold fluidly connected to the oxidant stream passages of said plurality of fuel cell assemblies, said method comprising:
    (a) supplying inert gas to said at least one oxidant manifold at a first pressure;
    (b) supplying fuel to said at least one fuel manifold at a second pressure greater than or equal to said first pressure;
    (c) applying a potential difference across at least one of said plurality of fuel cell assemblies such that the cathode of said at least one of said plurality of fuel cell assemblies is more positive than the anode thereof; and
    (d) measuring the transfer current across said at least one fuel cell assembly.

2. A method of detecting transfer leaks within a fuel cell stack, said stack comprising
  a plurality of fuel cell assemblies each comprising a membrane electrode assembly comprising an anode, a cathode, and an ion exchange membrane interposed therebetween,
  coolant stream passages in thermal communication with at least a portion of said fuel cell assemblies,
  at least one fuel manifold fluidly connected to the fuel stream passages of said plurality of fuel cell assemblies,
  at least one oxidant manifold fluidly connected to the oxidant stream passages of said plurality of fuel cell assemblies, and
  at least one coolant manifold fluidly connected to said coolant stream passages, said method comprising:
    (a) supplying fuel to said at least one fuel manifold at a first pressure;
    (b) supplying inert gas to said at least one oxidant manifold at a second pressure;
    (c) supplying fuel to said at least one coolant manifold at a third pressure;
    (d) applying a potential difference across at least one of said plurality of fuel cell assemblies such that the cathode of said at least one of said plurality of fuel cell assemblies is more positive than the anode thereof; and
    (e) measuring the transfer current across said at least one fuel cell assembly, wherein said third pressure is greater than at least one of said first and second pressures.

3. A method of detecting transfer leaks within a fuel cell stack, said stack comprising
  a plurality of fuel cell assemblies each comprising a membrane electrode assembly comprising an anode, a cathode, and an ion exchange membrane interposed therebetween,
  coolant stream passages in thermal communication with at least a portion of said fuel cell assemblies,
  at least one fuel manifold fluidly connected to the fuel stream passages of said plurality of fuel cell assemblies,
  at least one oxidant manifold fluidly connected to the oxidant stream passages of said plurality of fuel cell assemblies, and
  at least one coolant manifold fluidly connected to said coolant stream passages, said method comprising:
    (a) supplying inert gas to said at least one fuel manifold at a first pressure;
    (b) supplying fuel to said at least one oxidant manifold at a second pressure;
    (c) supplying fuel to said at least one coolant manifold at a third pressure;
    (d) applying a potential difference across at least one of said plurality of fuel cell assemblies such that the anode of said at least one of said plurality of fuel cell assemblies is more positive than the cathode thereof; and
    (e) measuring the transfer current across said at least one fuel cell assembly,
    wherein said third pressure is greater than at least one of said first and second pressures.

4. The method of any one of claims 2 or 3, wherein said first pressure is greater than said second pressure.

5. The method of any one of claims 2 or 3, wherein said first pressure is substantially the same as said second pressure.

6. The method of any one of claims 1, 2 or 3, wherein the pressure differential between said first and second pressures is from about 0 kPa to about 70 kPa.

7. The method of any one of claims 1, 2 or 3, wherein the pressure differential between said first and second pressures is from about 6.5 kPa to about 35 kPa.

8. The method any one of claims 1, 2 or 3, wherein said inert gas is selected from the group consisting of nitrogen, argon, helium and carbon dioxide.

9. The method of any one of claims 1, 2 or 3, wherein said potential difference has a magnitude of about 0.2 V to about 0.9 V.

10. The method of any one of claims 1, 2 or 3, wherein said potential difference has a magnitude of about 0.5 V.

11. The method of any one of claims 1, 2 or 3, further comprising comparing said measured transfer current with a reference transfer current.

12. An apparatus for detecting transfer leaks within a fuel cell stack, said stack comprising a plurality of fuel cell assemblies, at least one fuel manifold fluidly connected to said plurality of fuel cell assemblies, and at least one oxidant manifold fluidly connected to said plurality of fuel cell assemblies, said apparatus comprising:
(a) a fuel source fluidly connectable to said at least one fuel manifold for supplying fuel thereto at a first pressure;
(b) an inert gas source fluidly connectable to said at least one oxidant manifold for supplying inert gas thereto at a second pressure;
(c) a DC power supply connectable to at least one of said plurality of fuel cell assemblies; and
(d) at least one device for measuring the transfer current across at least one of said plurality of fuel cell assemblies.

13. An apparatus for detecting transfer leaks within a fuel cell stack, said stack comprising
a plurality of fuel cell assemblies each comprising a membrane electrode assembly comprising an anode, a cathode, and an ion exchange membrane interposed therebetween,
coolant stream passages in thermal communication with at least a portion of said fuel cell assemblies,
at least one fuel manifold fluidly connected to said plurality of fuel cell assemblies,
at least one oxidant manifold fluidly connected to said plurality of fuel cell assemblies, and
at least one coolant manifold fluidly connected to said coolant stream passages, said apparatus comprising:
(a) a first fuel source fluidly connectable to one of said fuel and oxidant manifolds for supplying fuel thereto at a first pressure;
(b) an inert gas source fluidly connectable to the other of said fuel and oxidant manifolds for supplying inert gas thereto at a second pressure;
(c) a second fuel source fluidly connectable to said at least one coolant manifold for supplying fuel thereto at a third pressure;
(d) a DC power supply connectable to at least one of said plurality of fuel cell assemblies; and
(e) at least one device for measuring the transfer current across at least one of said plurality of fuel cell assemblies.

14. The apparatus of claim 13, wherein said first fuel source is fluidly connected to said at least one fuel manifold and said inert gas source is fluidly connected to said at least one oxidant manifold.

15. The apparatus of claim 13 wherein said inert gas source is fluidly connected to said at least one fuel manifold and said first fuel source is fluidly connected to said at least one oxidant manifold.

16. The apparatus of claim 13 wherein said first fuel source and said second fuel source are the same.

17. The apparatus of any one of claims 12 or 13, wherein said first and second pressures are substantially the same.

18. The apparatus of any one of claims 12 or 13, wherein said device generates an output signal representative of said measured transfer current, the apparatus further comprising a transfer current display for receiving said output signal from said at least one device.

* * * * *